US012431653B2

(12) United States Patent
Yamaguchi

(10) Patent No.: US 12,431,653 B2
(45) Date of Patent: Sep. 30, 2025

(54) BRANCH ADAPTOR

(71) Applicant: HIROSE ELECTRIC CO., LTD., Kanagawa (JP)

(72) Inventor: Yoshiki Yamaguchi, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 367 days.

(21) Appl. No.: 18/099,713

(22) Filed: Jan. 20, 2023

(65) Prior Publication Data

US 2023/0246374 A1 Aug. 3, 2023

(30) Foreign Application Priority Data

Jan. 28, 2022 (JP) ................................ 2022-011630

(51) Int. Cl.
*H01R 13/40* (2006.01)
*H01R 13/405* (2006.01)
*H01R 13/629* (2006.01)
*H01R 31/06* (2006.01)
*H01R 13/516* (2006.01)

(52) U.S. Cl.
CPC ......... *H01R 13/405* (2013.01); *H01R 13/629* (2013.01); *H01R 31/06* (2013.01); *H01R 13/516* (2013.01)

(58) Field of Classification Search
CPC ................................ H01R 9/24; H01R 9/2408
USPC ................................ 439/723, 655, 189, 324
See application file for complete search history.

(56) References Cited

U.S. PATENT DOCUMENTS 5,645,455 A * 7/1997 Seki .................... H01R 13/405 439/189
7,723,619 B2 * 5/2010 Ohashi .................. H01R 43/24 439/736
10,361,525 B2 * 7/2019 Li ....................... H01R 31/005
(Continued)

FOREIGN PATENT DOCUMENTS

JP 2008153103 A 7/2008
JP 2013-45631 A 3/2013
(Continued)

OTHER PUBLICATIONS

Extended European Search Report (EESR) dated Jun. 14, 2023 for European Patent Application No. 23152064.4.
(Continued)

*Primary Examiner* — Phuong K Dinh
(74) *Attorney, Agent, or Firm* — RANKIN, HILL & CLARK LLP

(57) ABSTRACT

Provided is an adaptor including: a housing; and a terminal held by the housing, in which the housing includes: a first mating recess opening in a first opening direction; a plurality of second mating recesses opening in a second opening direction opposite to the first opening direction; and a projection portion, the terminal includes: a first contact portion extending in the first opening direction in the first mating recess; and a plurality of second contact portions extending in the second opening direction in the plurality of second mating recesses, respectively, and the projection portion is configured to protrude in the first opening direction from an inner surface, which is orthogonal to the first opening direction, of the first mating recess along the first contact portion in the first mating recess.

6 Claims, 9 Drawing Sheets

(56) References Cited

U.S. PATENT DOCUMENTS

| | | | | |
|---|---|---|---|---|
| 10,873,148 | B2 | 12/2020 | Murakami et al. | |
| 2008/0146094 | A1 | 6/2008 | Shimizu | |
| 2019/0363478 | A1* | 11/2019 | Ooyama | H01R 13/41 |

FOREIGN PATENT DOCUMENTS

| | | | |
|---|---|---|---|
| JP | 2019-153382 | A | 9/2019 |
| TW | M595349 | U | 5/2020 |

OTHER PUBLICATIONS

Japanese Office Action (JPOA) dated Apr. 14, 2025 for Japanese Patent Application No. 2022-011630; English machine translation.

Taiwanese Office Action issued on Apr. 2, 2025 for Taiwanese Patent Application No. 111147201 with its English machine translation.

* cited by examiner

BRANCH ADAPTOR

CROSS-REFERENCE TO RELATED APPLICATION

This application claims priority from Japanese Patent Application No. 2022-011630 filed with the Japan Patent Office on Jan. 28, 2022, the entire content of which is hereby incorporated by reference.

BACKGROUND

1. Technical Field

The present disclosure relates to an adaptor.

2. Related Art

Examples of an adaptor that causes one cable (electric wire) to branch into a plurality of cables (a branch adaptor or a branch connector) include a branch connector that mates to three mating connectors in a T-shape from three directions to electrically connect cables connected respectively to the mating connectors (for example, JP-A-2013-45631), and also a branch connector that mates to one mating connector from one side and to two mating connectors from the other side to electrically connect cables (for example, JP-A-2019-153382).

SUMMARY

An adaptor according to an embodiment of the present disclosure includes: a housing; and a terminal held by the housing, in which the housing includes: a first mating recess opening in a first opening direction; a plurality of second mating recesses opening in a second opening direction opposite to the first opening direction; and a projection portion, the terminal includes: a first contact portion extending in the first opening direction in the first mating recess; and a plurality of second contact portions extending in the second opening direction in the plurality of second mating recesses, respectively, and the projection portion is configured to protrude in the first opening direction from an inner surface, which is orthogonal to the first opening direction, of the first mating recess along the first contact portion in the first mating recess.

DETAILED DESCRIPTION

Figure 1A:
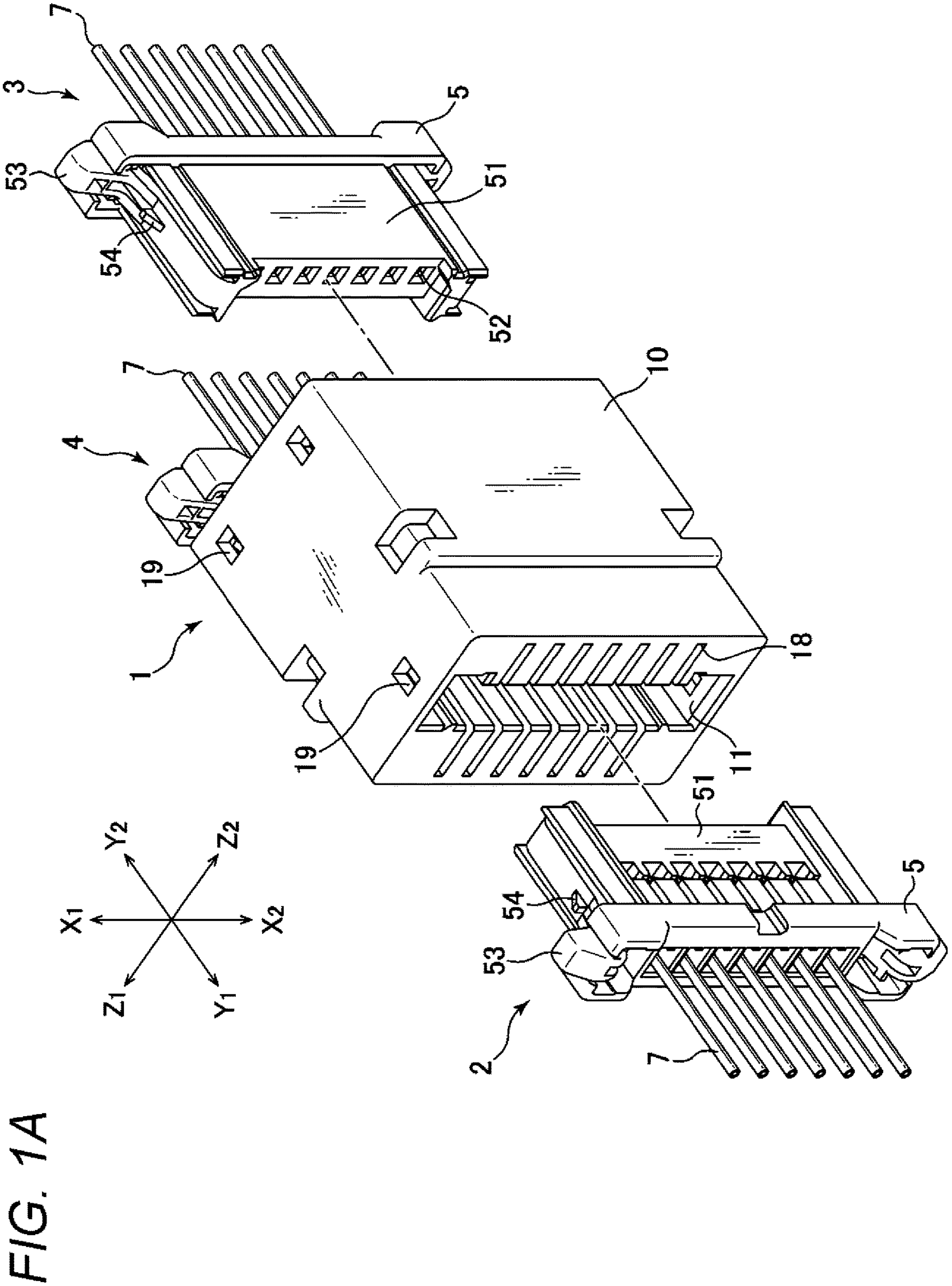
FIG. 1A is a perspective view illustrating the configurations of an adaptor and cable connectors according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, the known branch adaptor or branch connector has a problem that if terminals are press-fitted into a housing for assembly after the housing is formed, the workability of press-fitting the terminals is not satisfactory, and also has a problem that work efficiency or positioning accuracy in mating to a cable connector is not satisfactory.

The present disclosure has been made considering the above problems, and one object thereof is to provide an adaptor allowing improving the reliability of a mated state of a cable connector and the adaptor, in a branch adaptor having a press-fitted terminal.

Moreover, another object of the present disclosure is to provide an adaptor allowing improving work efficiency in press-fitting a terminal with the use of a jig, in a branch adaptor having the press-fitted terminal.

The objects and features of the present disclosure will be clear from the statements of the present description and the accompanying drawings.

A brief description of an outline of a representative of embodiments disclosed in the present application is as follows.

An adaptor according to an aspect of the present disclosure includes: a housing; and a terminal held by the housing, in which the housing includes: a first mating recess opening in a first opening direction; a plurality of second mating recesses opening in a second opening direction opposite to the first opening direction; and a projection portion, the terminal includes: a first contact portion extending in the first opening direction in the first mating recess; and a plurality of second contact portions extending in the second opening direction in the plurality of second mating recesses, respectively, and the projection portion is configured to protrude in the first opening direction from an inner surface, which is orthogonal to the first opening direction, of the first mating recess along the first contact portion in the first mating recess.

A brief description of effects obtained by the representative of the embodiments disclosed in the present application is as follows.

(1) The adaptor includes the projection portion in the back of the mating recess of the housing. Hence, when a cable connector mates to the adaptor, an end of the cable connector comes into contact with an end surface of the projection portion in the housing of the adaptor, and the cable connector is stopped and secured. Hence, positioning is facilitated, the mated state of the cable connector and the adaptor becomes stable, and the reliability improves.

(2) A groove is provided on each side of the projection portion in the housing of the adaptor. Hence, when the terminal is press-fitted with the use of a jig, the terminal can be pressed further back than the end surface of the projection portion. Hence, it is possible to ensure the terminal to be press-fitted in a normal position.

An embodiment of the present disclosure is described in detail hereinafter on the basis of the drawings. In all the drawings for describing the embodiment, the same reference numerals are in principle assigned to the same members, and repeated descriptions thereof may be omitted.

The following embodiment is described, being divided into a plurality of sections or embodiments, for convenience if necessary. However, unless particularly specified, they are not irrelevant to each other, and are in a relationship that one is, for example, a part or whole of a modification, details, or a supplemental explanation of the other. Moreover, in the following embodiment, for example, unless particularly specified and unless in theory clearly limited to a specific number, for example, the number (including the quantity, the numeric value, the amount, and the range) of elements is not limited to the specific number, and may be equal to or greater than, or equal to or less than, the specific number.

Figure 1B:
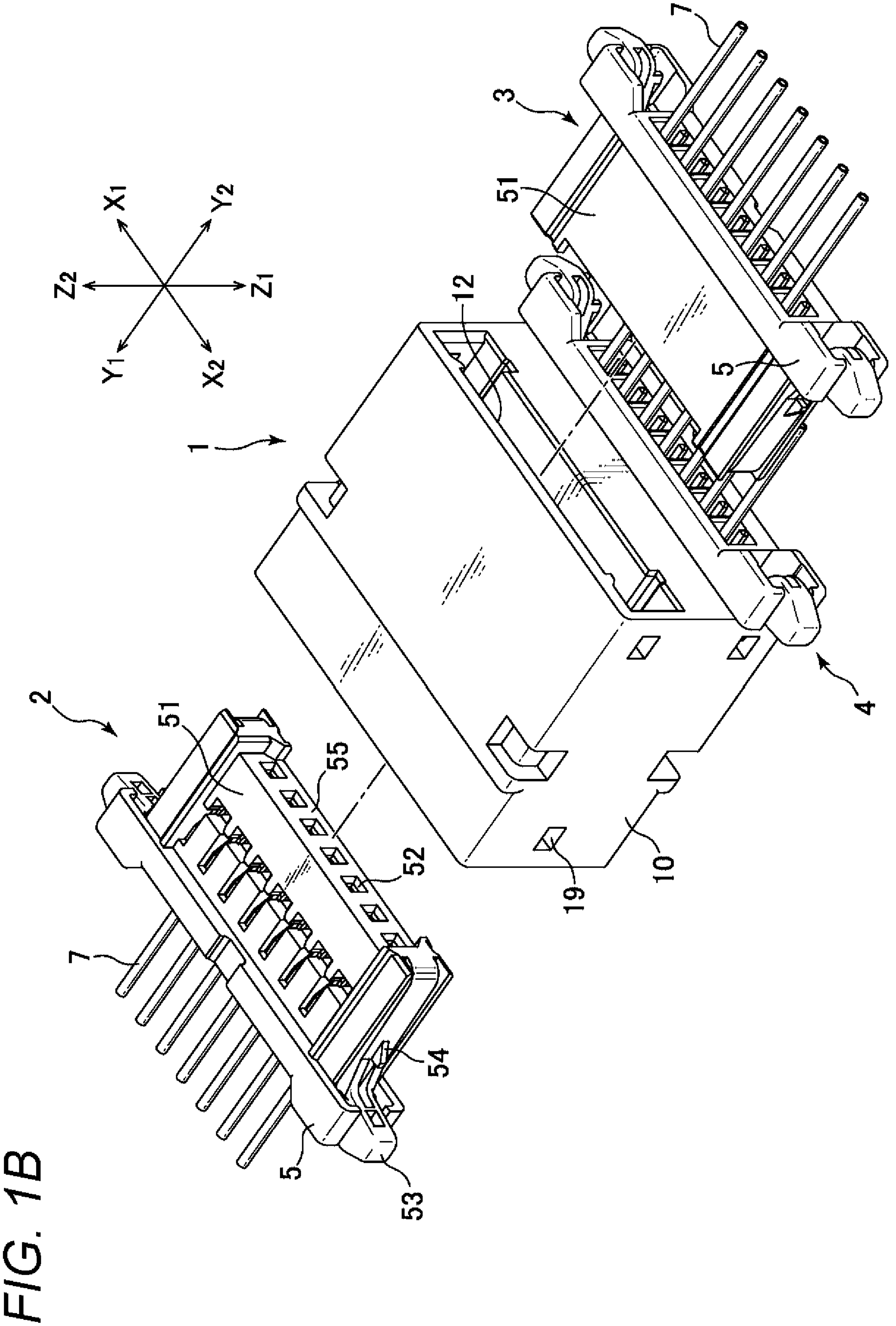
FIG. 1B is a perspective view illustrating the configurations of the adaptor and the cable connectors according to an embodiment of the present disclosure.
Figure 2:
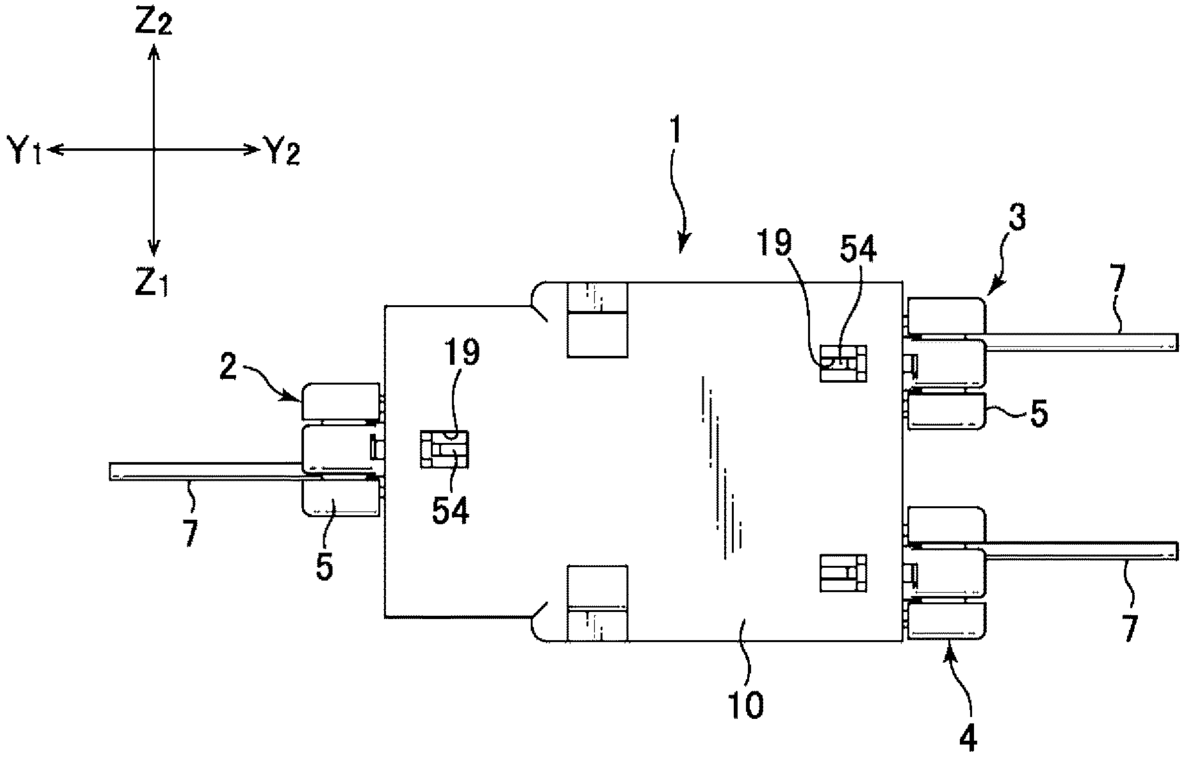
FIG. 2 is a side view illustrating a state after mating the adaptor and the cable connectors according to an embodiment of the present disclosure.
Figure 3:
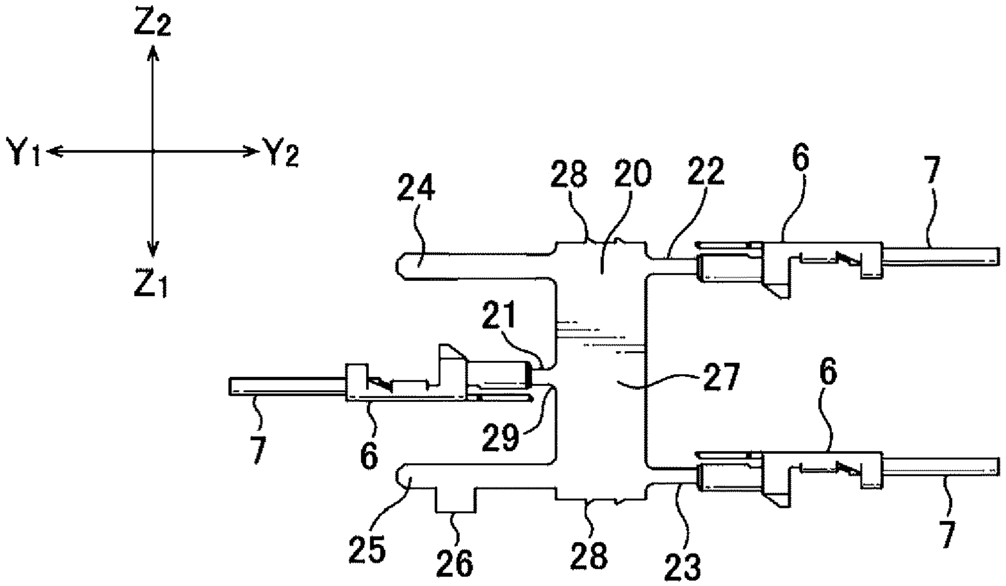
FIG. 3 is a side view of the configurations of the adaptor and the cable connectors of FIG. 2 without housing portions.
Figure 4A:
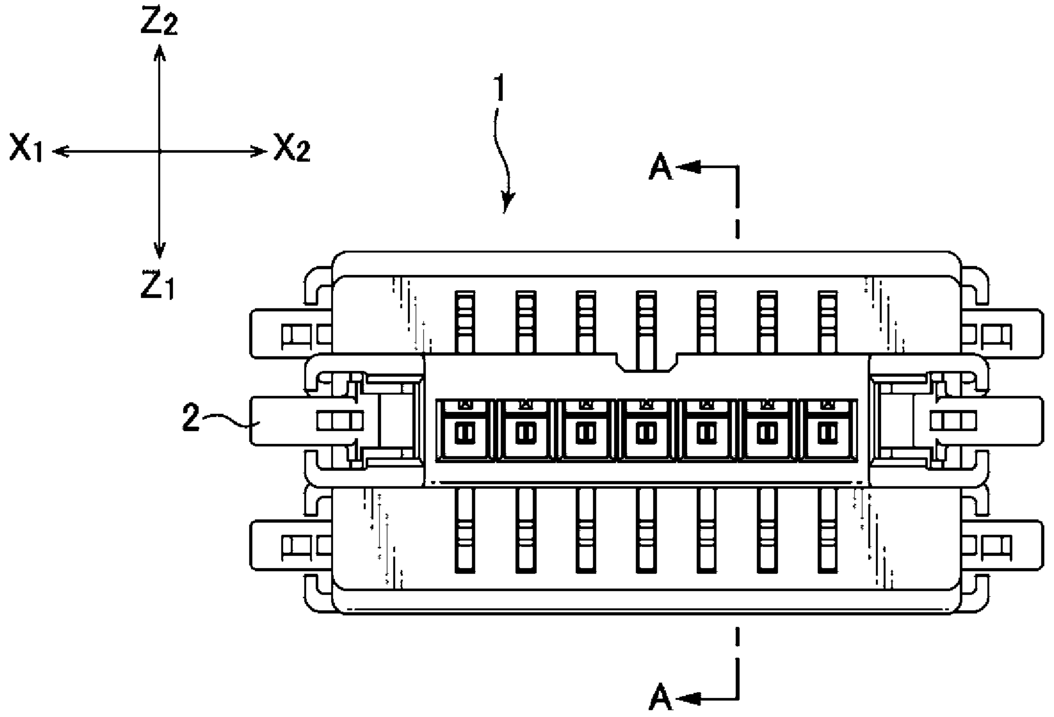
FIG. 4A is a front view illustrating the configurations of the adaptor and the cable connectors according to an embodiment of the present disclosure (cables are omitted)
Figure 4B:
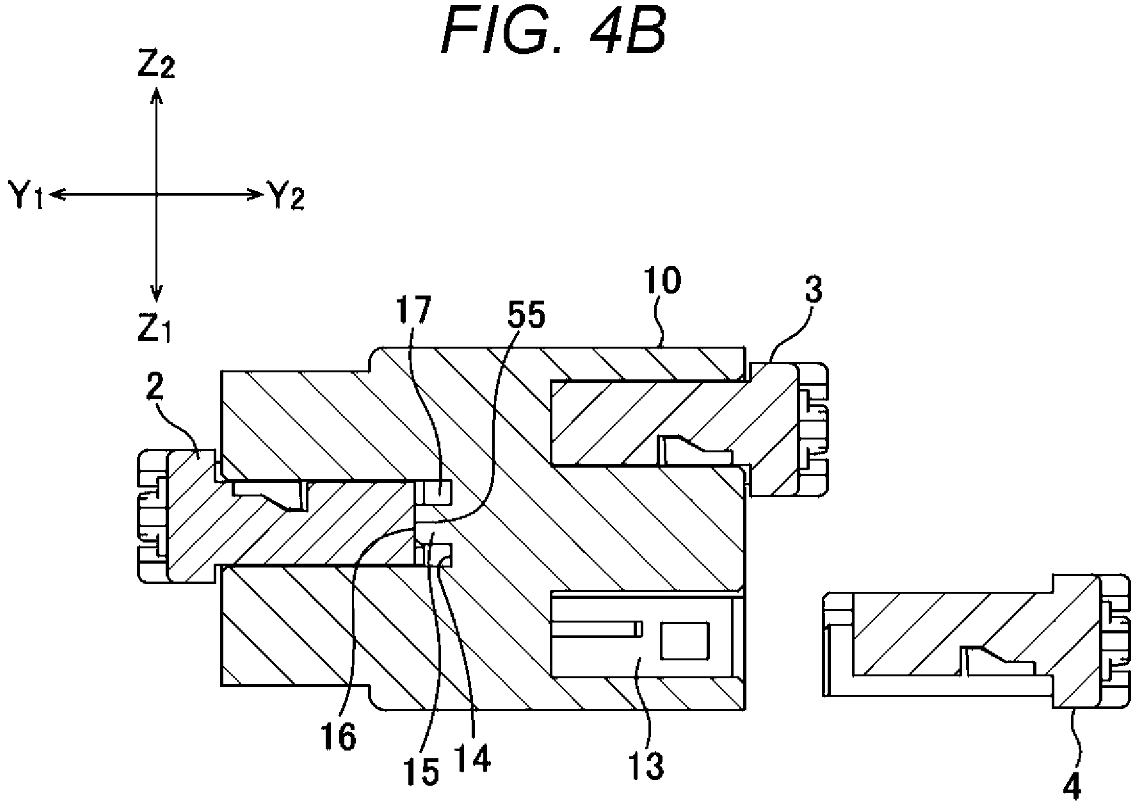
FIG. 4B is a cross-sectional view along section A-A of FIG. 4A.
Figure 5A:
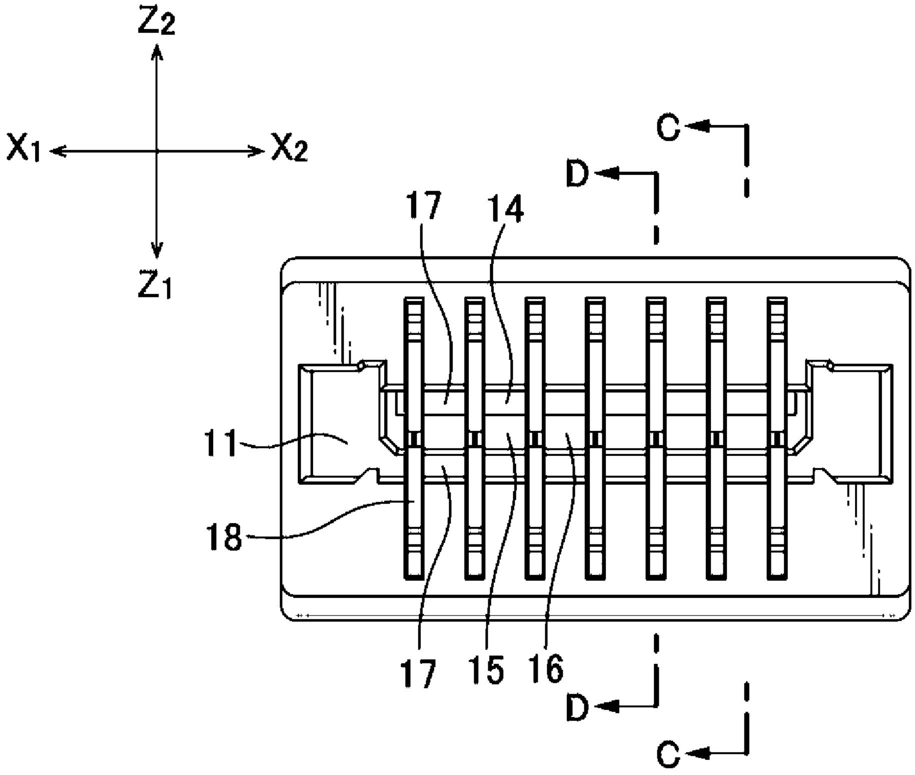
FIG. 5A is a front view illustrating the configuration of the adaptor according to an embodiment of the present disclosure.
Figure 5B:
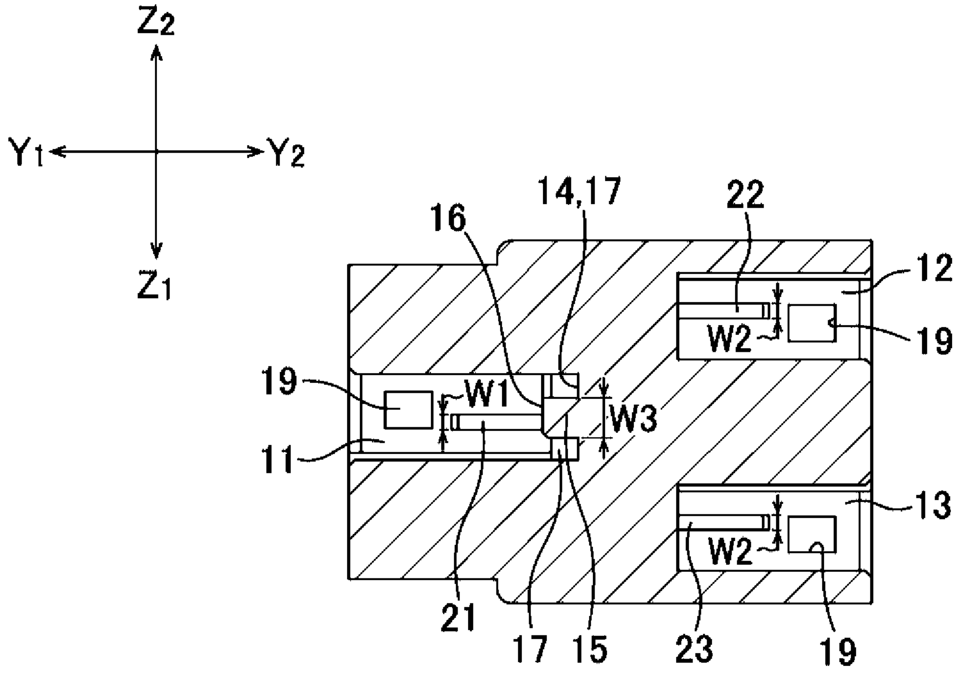
FIG. 5B is a cross-sectional view along section C-C of FIG. 5A.
Figure 5C:
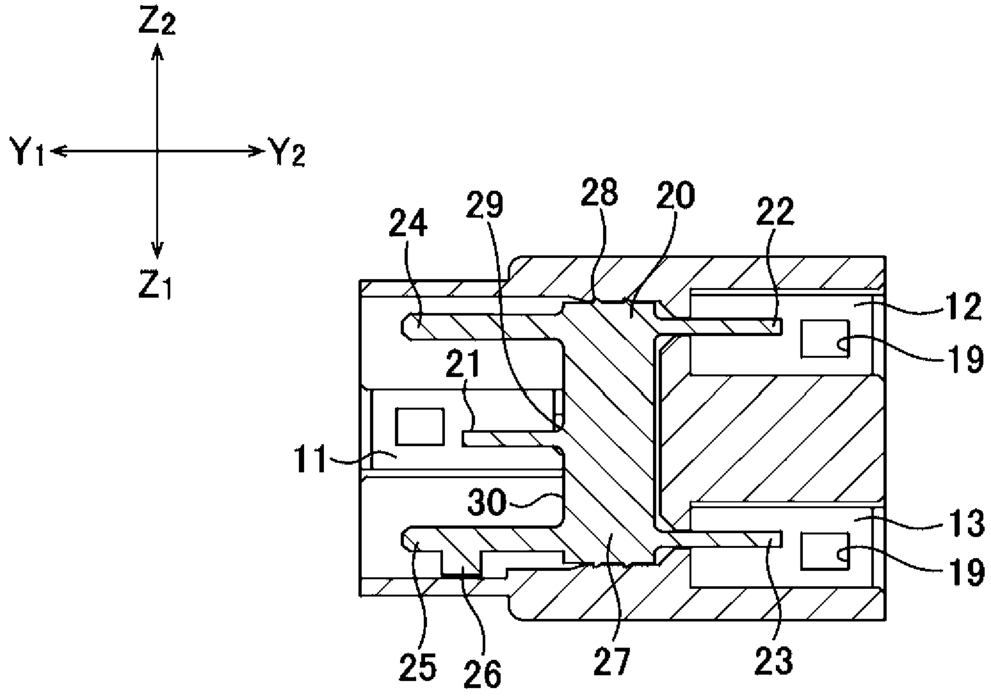
FIG. 5C is a cross-sectional view along section D-D of FIG. 5A.
Figure 6:
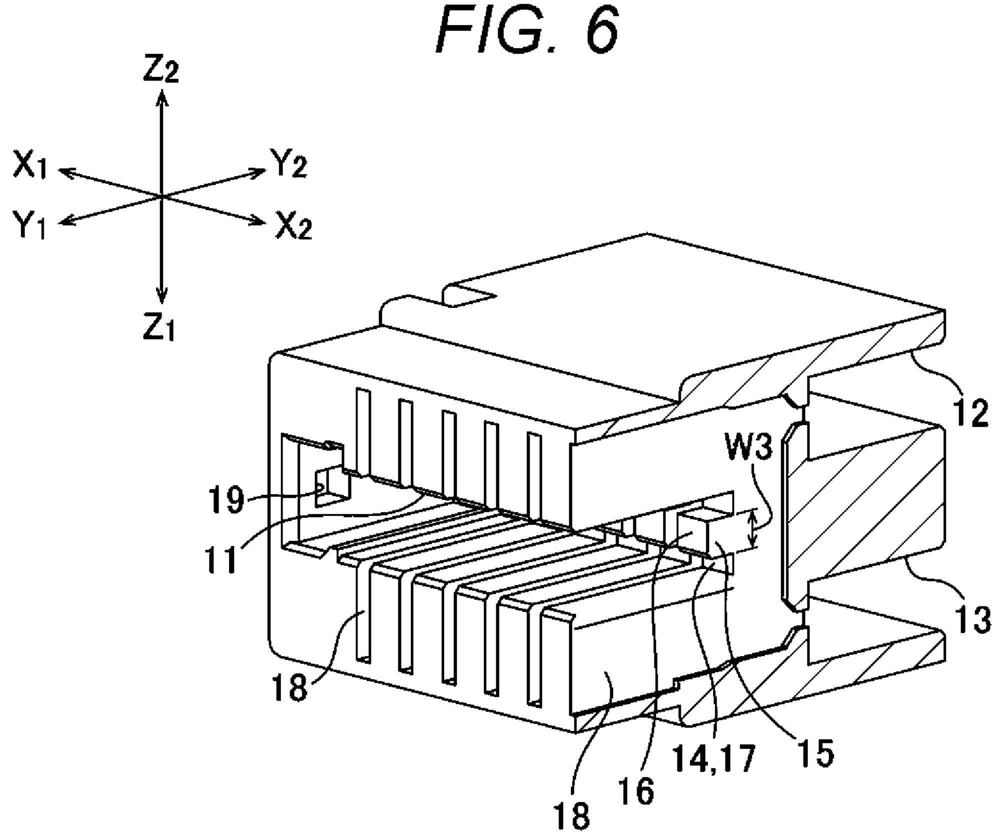
FIG. 6 is a cross-sectional perspective view illustrating the configuration of the housing of the adaptor according to an embodiment of the present disclosure.
Figure 7:
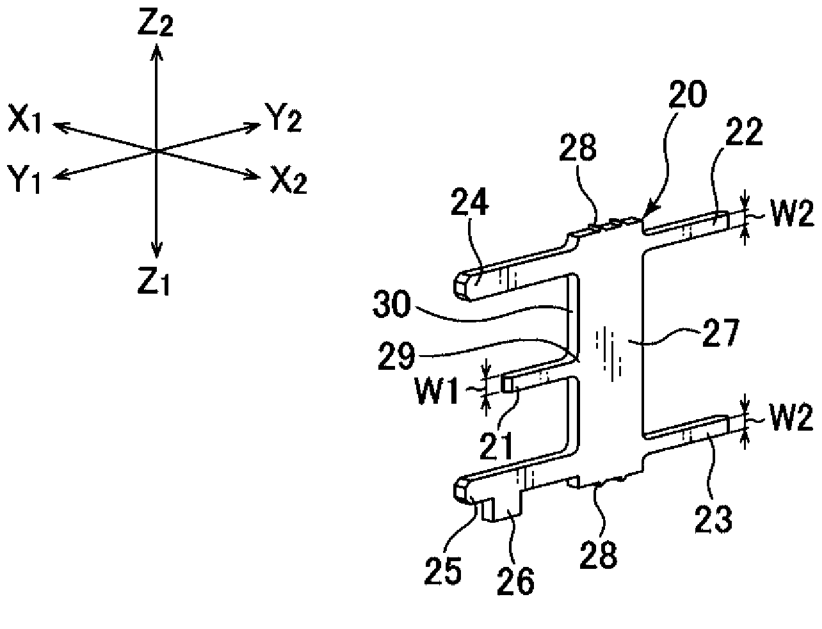
FIG. 7 is a perspective view illustrating the configuration of a terminal of the adaptor according to an embodiment of the present disclosure.

FIGS. 1A and 1B are perspective views illustrating the configurations of an adaptor and cable connectors according to an embodiment of the present disclosure. FIG. 2 is a side view illustrating a state after mating the adaptor and the cable connectors. FIG. 3 is a side view of the configurations of the adaptor and the cable connectors of FIG. 2 without housing portions. FIG. 4A is a front view illustrating the configurations of the adaptor and the cable connectors. FIG. 4B is a cross-sectional view along section A-A of FIG. 4A. In FIGS. 4A and 4B, cables 7 are not illustrated. FIG. 5A is a front view illustrating the configuration of the adaptor. FIG. 5B is a cross-sectional view along section C-C of FIG. 5A. FIG. 5C is a cross-sectional view along section D-D of FIG. 5A. FIG. 6 is a cross-sectional perspective view illustrating the configuration of the housing of the adaptor. FIG. 6 corresponds to a diagram where terminals are omitted from the cross-sectional view of FIG. 5C. FIG. 7 is a perspective view illustrating the configuration of the terminal of the adaptor.

First, the configuration of an adaptor 1 according to the embodiment is described with reference to FIGS. 1A and 1B. The adaptor 1 according to the embodiment is a branch adaptor (or a branch connector) that causes one cable to branch into a plurality of cables. An example where one cable branches into two cables appears in the embodiment. However, the present disclosure is not limited to this example. The adaptor of the present disclosure may be a branch adaptor that causes one cable to branch into three or more cables. Moreover, an example where seven cables 7 are arranged in parallel and each cable branches appears in the embodiment. However, the present disclosure is not limited to this example. The number of cables to branch may be one. Alternatively, a plurality of cables, for example, two to six cables, or eight or more cables, may be arranged in parallel, and each cable may branch.

In the embodiment, as illustrated in FIGS. 1A and 1B, one cable connector 2 (a first connector) to which the seven cables 7 are connected mates into a mating recess 11 (a first mating recess) of the adaptor 1. Two cable connectors 3 and 4 (a plurality of second connectors) mate into two mating recesses 12 and 13 (a plurality of second mating recesses) of the adaptor 1, respectively. Consequently, each of the cables 7 of the cable connector 2 is caused by the adaptor 1 to branch into two. The branched cables are electrically connected to the cables 7 of the cable connectors 3 and 4, respectively. The number of branches may be three or more, and the number of the mating recesses 12 and 13 may be three or more.

As illustrated in FIGS. 1A to 7, the adaptor 1 includes a housing 10, and a plurality of terminals 20 (refer to, for example, FIG. 3) in the housing 10. Each of the plurality of terminals 20 is press-fitted into the housing 10 in the assembly process of the adaptor 1, and held by the housing 10. The housing 10 is formed of an insulating material such as resin. A thin flat plate of a conductive material such as metal is pressed (stamped) to form the terminal 20.

The housing 10 includes the mating recess 11 (the first mating recess) and the mating recesses 12 and 13 (the second mating recesses). The mating recess 11 opens toward the cable connector 2 (in a Y1-direction and a first opening direction). The plurality of (two or more) mating recesses 12 and 13 (the second mating recesses) opens toward the cable connectors 3 and 4 on an opposite side to the mating recess 11 (in a Y2-direction and a second opening direction). The cable connector 2 mates into the mating recess 11. The cable connector 3 mates into the mating recess 12. The cable connector 4 mates into the mating recess 13. As a result, each of the plurality of cables 7 of the cable connector 2 branches. The branched cables are electrically connected to the plurality of cables 7 of the cable connectors 3 and 4, respectively.

As illustrated in FIG. 1B, the cable connector 2 and the cable connectors 3 and 4 have the same shape and are compatible with each other. Each of the cable connectors 2, 3, and 4 includes a housing 5 and terminals 6 (refer to, for example, FIG. 3). Each of the housings 5 of the cable connectors 2, 3, and 4 includes a mating portion 51 that is inserted into the respective mating recess 11, 12, or 13 of the adaptor 1 to mate to the adaptor 1. The distal end of each of the mating portions 51 is provided with a plurality of holes 52. The terminals 6 are installed in the plurality of holes 52, respectively. The terminals 6 placed in the holes 52 come into contact with the terminals 20 of the adaptor 1. Accordingly, the cable connectors 2, 3, and 4 are electrically connected to the adaptor 1. Moreover, each of the housings 5 is provided, near the cables 7, with a lock operation portion 53 and a lock claw 54. The lock operation portions 53 and the lock claws 54 are used to lock and cancel the mating of the adaptor 1 and the cable connectors 2, 3, and 4.

As illustrated in FIGS. 3 and 7, each of the plurality of terminals 20 of the adaptor 1 includes a contact portion 21 (a first contact portion), contact portions 22 and 23 (second contact portions), and carrier coupling portions 24 and 25. The contact portion 21 (the first contact portions) extends from the middle of a main body portion 27 of the terminal 20 toward the cable connector 2 (in the Y1-direction). The plurality of contact portions 22 and 23 (the second contact portions) extends from an end of the main body portion 27 of the terminal 20 toward an opposite side to the contact portion 21 (toward the cable connectors 3 and 4 and in the Y2-direction). The two carrier coupling portions 24 and 25 are coupled to a carrier in the assembly process of the adaptor 1.

An X1X2-direction, a Y1Y2-direction, and a Z1Z2-direction in, for example, FIG. 7 are the width direction, the length direction, and the thickness direction of the terminal 20, respectively.

The structure is as follows: when the cable connectors 2, 3, and 4 mate to the adaptor 1, the contact portions 21 mate with the terminals 6 of the cable connector 2, and the contact portions 22 and 23 mate with the terminals 6 of the cable connectors 3 and 4, respectively; consequently, the cable connector 2 is electrically connected to the cable connector 3, the cable connector 2 to the cable connector 4, and the cable connector 3 to the cable connector 4. Any of the cable connectors 2, 3, and 4 may be an input or output for electrical signals. Moreover, the contact portions 21 may be located in the mating recess 11 of the housing 10, and the contact portions 22 and 23 may be located in the mating recesses 12 and 13, respectively.

Moreover, the carrier coupling portion 25 of each of the terminals 20 is provided with an improper insertion prevention portion 26 for preventing the improper insertion of the terminal 20 upon press-fitting the terminal 20 into the housing 10. In the embodiment, the two carrier coupling portions 24 and 25 are provided to each of the terminals 20. However, only one of the carrier coupling portions may be provided. Moreover, the improper insertion prevention portion 26 may be omitted. Each side of the main body portion 27 of each of the terminals 20 in the Z1Z2-direction is provided with a press-fitting projection 28 that digs into the inner wall surface of the housing 10 to secure the terminal 20 to the housing 10 when the terminal 20 is press-fitted and secured in the housing 10. Moreover, each of the terminals 20 includes a joint portion 29 between the contact portion 21 and the main body portion 27, that is, in a portion where the contact portion 21 is joined to the main body portion 27. Each of the joint portions 29 is configured in such a manner as to gradually expand from the contact portion 21 toward the main body portion 27 in the thickness direction of the terminal 20 (in the Z1Z2-direction). It is preferable that the joint portion 29 be configured in such a manner as to expand in a curved manner (a rounded form).

The contact portion 21 of each of the terminals 20 is placed, protruding, in the mating recess 11. In addition, the contact portions 22 and 23 of each of the terminals 20 are placed, protruding, in the plurality of mating recesses 12 and 13 (the second mating recesses), respectively. The contact portion 21 extends from the main body portion 27 in the first opening direction (the Y1-direction) in the mating recess 11. The contact portions 22 and 23 extend from the main body portion 27 in the second opening direction (the Y2-direction) in the mating recesses 12 and 13, respectively.

A thickness (W2) of the contact portions 22 and 23 in the thickness direction of the terminal 20 (in the Z1Z2-direction) is equal to a thickness (W1) of the contact portion 21 in the thickness direction of the terminal 20 (in the Z1Z2-direction) (refer to FIGS. 5B and 7).

The housing 10 includes projection portions 15 protruding from an inner surface 14 of the mating recess 11 toward the first opening direction (toward Y1) along the contact portions 21 of the terminals 20 in the mating recess 11 (refer to, for example, FIG. 6). The inner surface 14 of the mating recess 11 is an inner surface of the mating recess 11 (an XZ-plane in the recess) in a direction orthogonal to the first opening direction. The mating recess 11 is configured in such a manner that when the cable connector 2 mates into the mating recess 11 of the adaptor 1, an end 55 of the housing 5 of the cable connector 2 comes into contact with end surfaces 16 of the projection portions 15 so that the cable connector 2 stops (refer to FIG. 4B). The end surfaces 16 of the projection portions 15 are located closer to the mating port (in the Y1-direction) than end surfaces 30 on the mating port side (in the Y1-direction) of the main body portions 27 of the terminals 20. The end surfaces 16 of the projection portions 15 are located closer to the mating port than the end surfaces 30 of the main body portions 27. Accordingly, the end 55 of the housing 5 of the cable connector 2 does not come into contact with the terminals 20 upon the mating of the cable connector 2.

Moreover, the housing 10 includes a groove 17 on each side of the projection portions 15 in the Z1Z2-direction (the thickness direction of the terminals 20). The grooves 17 are provided respectively between the projection portions 15 and two inner surfaces, which are parallel to the first opening direction, of the mating recess 11. In FIGS. 5B and 6, the grooves 17 are provided above (on the Z2-direction side of) and below (on the Z1-direction side of) the projection portions 15, respectively. When the terminals 20 are press-fitted into the housing 10, a distal end 81 of a jig 8 is inserted into the grooves 17. The grooves 17 have a shape and a dimension that allow inserting the distal end 81 (refer to, for example, FIG. 9A) of the jig 8 when the terminals 20 are press-fitted into the housing 10. Moreover, the housing 10 includes terminal insertion spaces 18 into each of which the respective terminal 20 is inserted when being press-fitted. Two ends of the housing 10 in the X1X2-direction are provided with lock holes 19 that are engaged with the lock claws 54 of the cable connectors 2, 3, and 4 to lock the mating.

As illustrated in the cross-sectional view of FIG. 5B, a thickness (W3) of the projection portion 15 in the Z1Z2-direction is greater than the thickness (W1) of the contact portion 21 in the Z1Z2-direction, and the projection portion 15 is configured in such a manner as to conceal a part of the contact portion 21, and the joint portion 29. In other words, the thickness (W3) of the projection portion 15 in the thickness direction of the terminal 20 is greater than the thickness of the joint portion 29 in the thickness direction of the terminal 20. Specifically, the thickness (W3) of the projection portion 15 in the Z1Z2-direction is greater than the maximum thickness of the joint portion 29 in the Z1Z2-direction.

Moreover, the plurality of terminals 20 is evenly spaced in parallel in the width direction of the terminals 20 (in the X1X2-direction) in the mating recess 11 and the mating recesses 12 and 13. The projection portions 15 are each provided between the terminals 20, spaced evenly in the X1X2-direction, in the mating recess 11. In other words, each of the projection portions 15 is provided between the adjacent terminals 20, and the terminals 20 and the projection portions 15 are alternately aligned at regular intervals in the X1X2-direction.

Figure 8A:
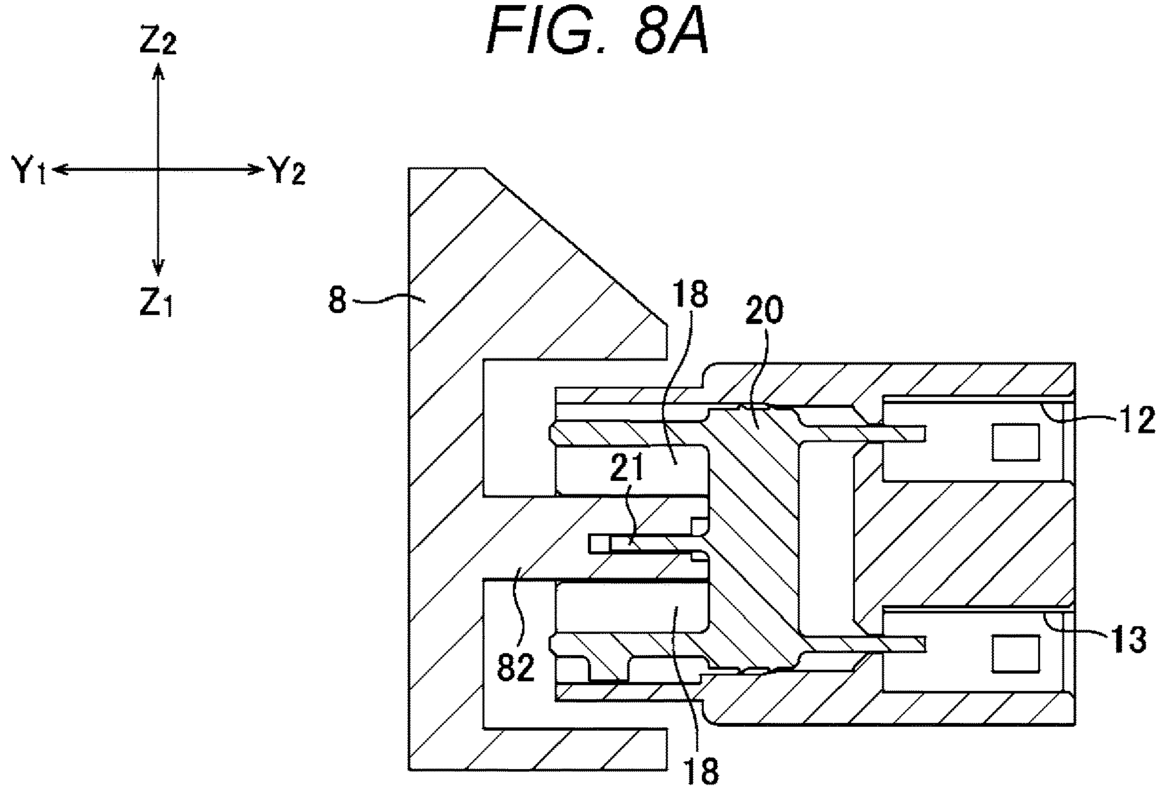
FIG. 8A is a cross-sectional view illustrating a process of press-fitting the terminals of the adaptor according to an embodiment of the present disclosure (in the middle of press-fitting) (the view corresponding to section D-D of FIG. 5A)
Figure 8B:
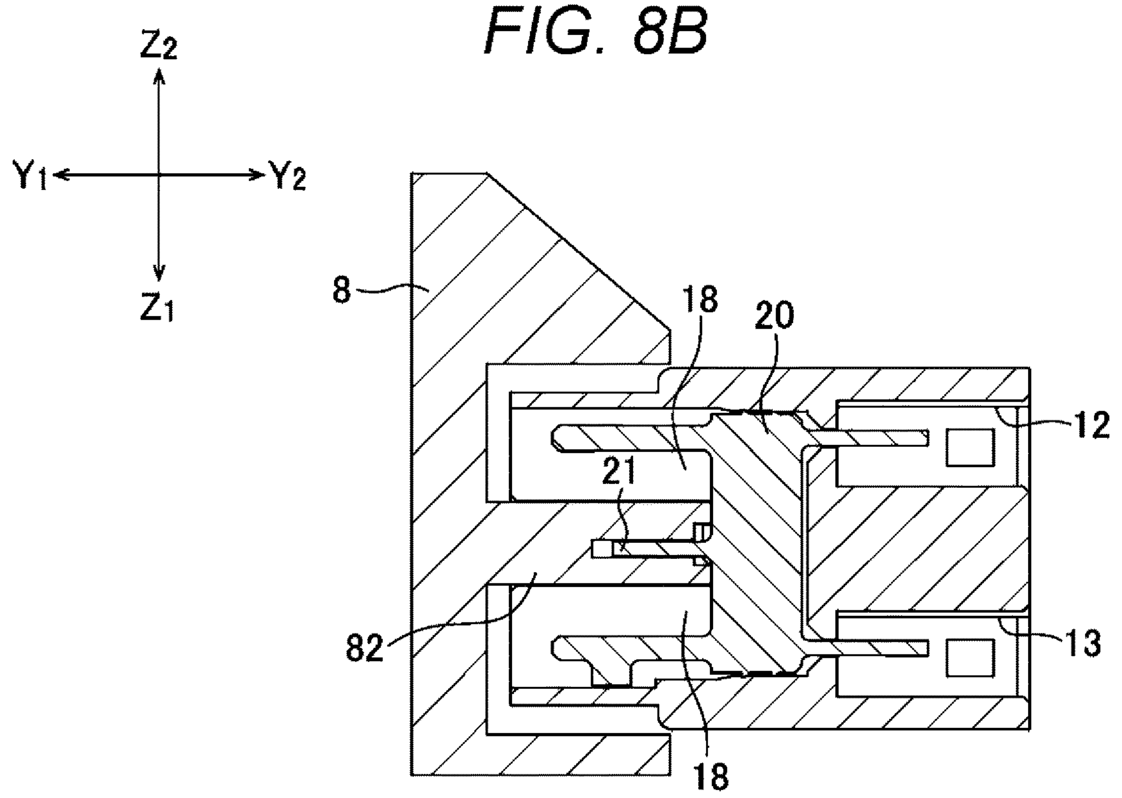
FIG. 8B is a cross-sectional view illustrating the process of press-fitting the terminals of the adaptor according to an embodiment of the present disclosure (press-fitting completed) (the view corresponding to section D-D of FIG. 5A)
Figure 9A:
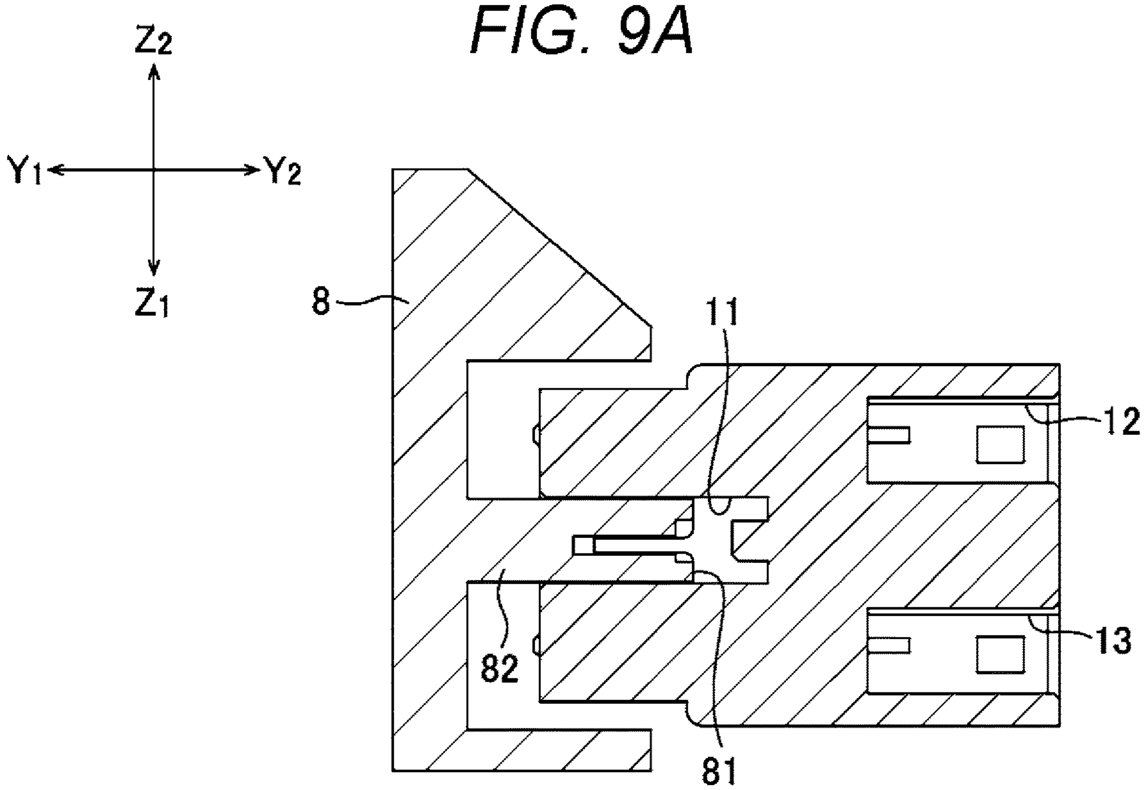
FIG. 9A is a cross-sectional view illustrating the process of press-fitting the terminals of the adaptor according to an embodiment of the present disclosure (in the middle of press-fitting) (the view corresponding to section C-C of FIG. 5A)
Figure 9B:
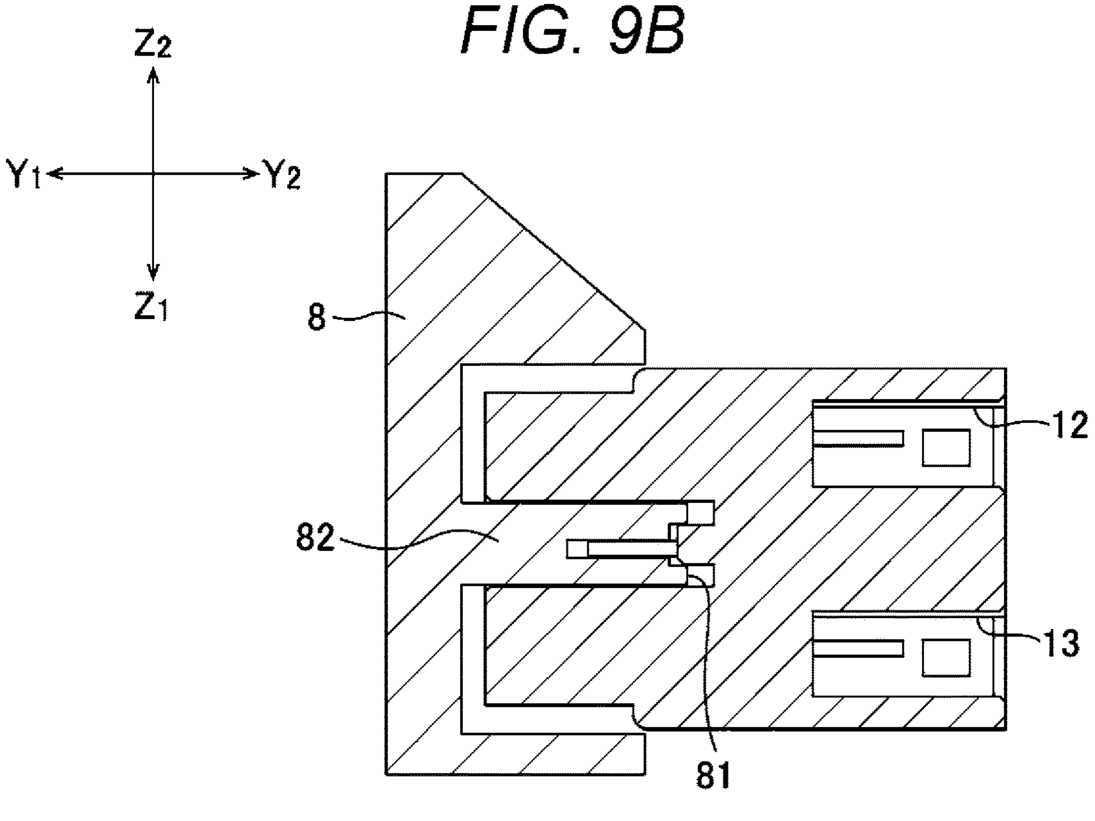
FIG. 9B is a cross-sectional view illustrating the process of press-fitting the terminals of the adaptor according to an embodiment of the present disclosure (press-fitting completed) (the view corresponding to section C-C of FIG. 5A).

Next, a method for press-fitting the terminals 20 into the housing 10 in the assembly process of the adaptor 1 is described with reference to FIGS. 8A to 9B. FIGS. 8A to 9B are cross-sectional views illustrating a process of press-fitting the terminals into the adaptor according to an embodiment of the present disclosure. FIGS. 8A and 9A illustrate a temporary holding state, and FIGS. 8B and 9B illustrate a state after press-fitting (a normal position). FIGS. 8A and 8B correspond to FIG. 5C, and FIGS. 9A and 9B correspond to FIG. 5B.

When the terminals 20 are press-fitted into the adaptor 1, the jig 8 is used. The jig 8 includes a protruding portion 82 that can be inserted into the mating recess 11 of the housing 10. The protruding portion 82 has a shape that is long in the X1X2-direction. The plurality of terminals (seven terminals in the embodiment) is arranged in the X1X2-direction, and the contact portions 21 of the plurality of terminals 20 are sandwiched by the protruding portion 82. The terminals 20 are then inserted into the terminal insertion spaces 18 of the housing 10 from the Y1 side with the use of the jig 8. The terminals 20 are pressed toward the Y2-direction with the use of jig 8, and press-fitted into the housing 10. FIGS. 8A and 9A illustrate a temporary securing position of the terminals 20. The terminals 20 are pressed further to the design normal position. The press-fitting process is then completed. FIGS. 8B and 9B illustrate the normal position of the terminals that have been press-fitted. When the terminals 20 are press-fitted with the use of the jig 8, the grooves 17 on the two sides (the Z1-direction side and the Z2-direction side) of the projection portions 15 of the housing 10 in the Z1Z2-direction allow inserting the terminals 20 further back (toward the Y2-direction) than the end surfaces 16 of the projection portions 15 in the mating recess 11 without the distal end 81 of the jig 8 coming into contact with the end surfaces 16 of the projection portions 15.

Therefore, the adaptor 1 of the embodiment includes the projection portions 15 in the back of the mating recess 11 of the housing 10. Accordingly, when the cable connector 2 mates to the adaptor 1, the end 55 of the housing 5 of the cable connector 2 comes into contact with the end surfaces 16 of the projection portions 15 in the housing 10 of the adaptor 1 to stop and secure the cable connector 2. Hence, positioning is facilitated, the mated state of the cable connector 2 and the adaptor 1 becomes stable, and the reliability improves.

Moreover, the grooves 17 are provided on the two sides of the projection portions 15 in the housing 10 of the adaptor 1. Hence, when the terminals 20 are press-fitted with the use of the jig 8, the terminals 20 can be pressed further back (toward the Y2-direction) than the end surfaces 16 of the projection portions 15. Consequently, it is possible to ensure the terminals 20 to be press-fitted in the normal position and to improve the work efficiency of press-fitting of the terminals.

The X1X2-direction, the Y1Y2-direction, and the Z1Z2-direction in the above embodiment can also be referred to as the width direction, the length direction, and the thickness direction (height direction), respectively.

Up to this point the present disclosure has been specifically described on the basis of the embodiment. However, the present disclosure is not limited to the above embodiment. It is needless to say that the embodiment can be modified in various manners within the scope that does not depart from the gist of the present disclosure.

The present disclosure can be used for electronic equipment such as mobile information terminals, automotive peripheral devices, and personal computers.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A branch adaptor comprising:

a housing; and a plurality of terminals held by the housing, wherein the housing includes:

a first mating recess opening in a first opening direction perpendicular to a terminal arrangement direction in which the plurality of terminals is arranged;

a plurality of second mating recesses opening in a second opening direction opposite to the first opening direction;

a plurality of projection portions; and a plurality of grooves, each of the plurality of terminals includes:

a first contact portion extending in the first opening direction in the first mating recess; and a plurality of second contact portions extending in the second opening direction in the plurality of second mating recesses, respectively, the plurality of the projection portions is provided spaced apart from one another between the terminals adjacent to each other in the terminal arrangement direction, and each of the plurality of projection portions is configured to protrude in the first opening direction from an inner surface, which is orthogonal to the first opening direction, of the first mating recess along the first contact portion in the first mating recess, and the plurality of the grooves is provided on two sides of each of the plurality of the projection portions in a thickness direction perpendicular to the terminal arrangement direction and the first opening direction, and spaced apart from one another between the terminals adjacent to each other in the terminal arrangement direction.

2. The branch adaptor according to claim 1, wherein a thickness of the second contact portions in the thickness direction is equal to a thickness of the first contact portion in the thickness direction.

3. The branch adaptor according to claim 1, wherein a thickness of the projection portion in the thickness direction is greater than a thickness of the first contact portion.

4. The branch adaptor according to claim 1, wherein each of the plurality of the terminals includes a main body portion and a joint portion, the joint portion is provided between the first contact portion and the main body portion in such a manner as to gradually expand from the first contact portion toward the main body portion, and a thickness of the projection portion in the thickness direction is greater than a thickness of the joint portion in the thickness direction.

5. The branch adaptor according to claim 1, wherein the plurality of the terminals is evenly spaced in the terminal arrangement direction of the terminals in the first and second mating recesses.

6. The branch adaptor according to claim 1, wherein the plurality of the second mating recesses is spaced apart from each other in the thickness direction, and the plurality of the second contact portions is spaced apart from each other in the thickness direction so as to correspond to the plurality of the second mating recesses.

* * * * *